United States Patent [19]

Bennett

[11] Patent Number: 4,740,056
[45] Date of Patent: Apr. 26, 1988

[54] COLLAPSIBLE CORNER REFLECTOR

[76] Inventor: John G. Bennett, 8698 Hedgeway, Utica, Mich. 48087

[21] Appl. No.: 855,868

[22] Filed: Apr. 24, 1986

[51] Int. Cl.$^4$ ............................................. G01S 7/36
[52] U.S. Cl. ..................................... 350/102; 342/8
[58] Field of Search ................ 350/100, 102, 103; 342/7, 8, 9

[56] References Cited

U.S. PATENT DOCUMENTS 3,276,017 9/1966 Mullin ................................. 350/102
4,096,479 6/1978 Van Buskirk ........................... 342/7

Primary Examiner—John K. Corbin
Assistant Examiner—Vincent J. Lemmo

[57] ABSTRACT

A compactible decoy device. A decoy device according to this invention has a body of resilient foam material having at least one and preferably more radiation reflecting surfaces disposed within its volume. The radiation reflecting surfaces are also collapsible. The device can be compressed in all three dimensions and will deploy to the fully expanded position upon release from the compressed position.

9 Claims, 1 Drawing Sheet

COLLAPSIBLE CORNER REFLECTOR

GOVERNMENT INTEREST

The invention described herein may be manufactured, used, and licensed by or for the Government for governmental purposes without payment to me of any royalty.

BACKGROUND OF THE INVENTION

In one aspect this invention relates to collapsible items. In a further aspect, this invention relates to devices which can reflect radiation so as to simulate like a target.

Reflecting materials such as metal strips have been used by various military forces to simulate the presence of a military target so as to confuse an enemy. A primary method of determining the presence and location of an assumed intruder is the analysis of the reflection of a wave such as microwaves, millimeter waves and the like from a metallic surface. The presence of a metallic object is determined by presence of a strong reflection.

In most cases, it is impractical to construct and deploy a full sized decoy. This is particularly true of large materiel, i.e. tanks or trucks. Consequently work has been performed to develop a small decoy which can strongly reflect microwaves. One example used in the past is a plurality of metallic strips which can be broadcast from an airplane or the like to float freely downward to the ground. Such devices represent an initial attempt to construct a decoy. However, such decoys are two dimensional and therefore not all the decoys were capable of reflecting radiation back to a source there being no substantial reflection from the sides of a two dimensional decoy. This lessens the effectiveness of an array of decoys and requires the deployment of a larger number of decoys. Further, prior art devices tend to be formed from rigid material making them difficult to store. It would be desirable to have even two dimensional decoys stored in s collapsed condition and self deploy when desired.

It is desirable to have a decoy which has a three dimensional configuration when deployed with the ability to reflect detection rays incident on the device from virtually any angle. The devicc is preferably collapsible and can be stored in the collapsed position for substantial periods; yet it can be easily deployed when necessary to its three dimensional configuration.

One example of a suitable decoy structure is described in U.S. Pat. No. 4,503,101; said patent being assigned to the United States Government as represented by the Secretary of the Army. The patented device disclosed a decoy with a plurality of panels which fold about a common axis and which can be deployed to form a three dimensional figure.

SUMMARY OF THE INVENTION

It is desired to provide a decoy having the reflective properties of the most effective prior art decoys and which can be collapsed in all three dimensions to form a very compact decoy.

A highly compactible, expanding decoy device according to this invention and suitable for reflecting detection radiation is formed with a body of a resiliant foam material that can be crushed or collapsed in three dimensions. At least one and preferably more, radiation reflecting surfaces are disposed within the resiliant foam. The radiation reflecting surfaces are formed of a flexible material and attached to the resilient collapsible foam material. The resulting device can be compressed in three dimensions to a small volume and when released the foam will expand to its uncompressed shape and deploy the radiation reflecting surfaces to a relatively planar configuration.

BRIEF DESCRIPTION OF THE DRAWING

In the accompanying drawing

DESCRIPTION OF THE PREFERRED EMBODIMENTS

Figure 1:
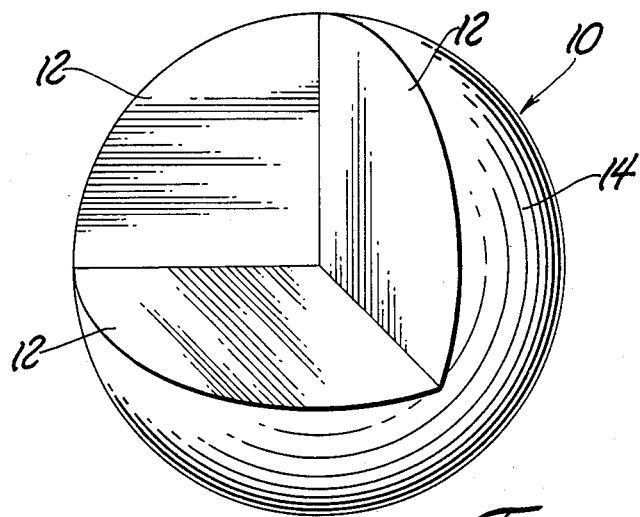
FIG. 1 is a perspective view of one embodiment of this invention with a segment removed to show the radiation reflective material.

Referring to the accompanying drawing and initially to FIG. 1, a compactible decoy according to this invention is designated generally 10. As shown, the decoy has a spherical outer surface with a plurality of planes of flexible material 12 disposed within the spherical outer surface. The flexible material 12 is of a composition which reflects radiation of the type normally used to detect and measure the distance from a range finder to an assumed target. Such radiation can be millimeter, micrometer or other wave lengths commonly used by military range finder apparatus. The thin flexible material can be thin metal foil such as aluminum foil, steel foil or other metallic foil which can be easily collapsed without destroying its structural integrity. Also usable as the thin flexible material 12 are reflective polymeric sheets such metal coated mylar, metal coated polyethylene, metal coated polypropylene and similarly metal coated polymeric materials. One example of a thin flexible material useful in the practice of this invention is mylar sheeting on which a thin coating of aluminum has been vapor deposited. Another example of a thin flexible reflective material is metal coated cloth.

The reflective material can be disposed within the foam material as plates, planes, strips or other flat reflective surfaces. The reflective surfaces can be arranged in a predetermined configuratlon or can be in a random configuration.

Figure 2:
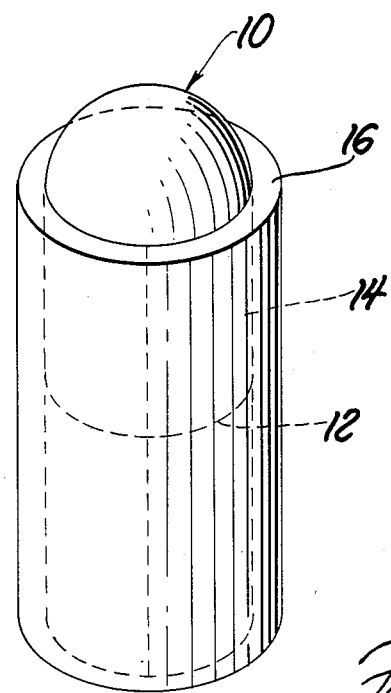
FIG. 2 shows the embodiment of FIG. 1 stored in a cylindrical cannister.

FIGS. 1 and 2 show a preferred configuration with at least one and even more preferably a plurality of the flexible planes 12 in the compactible decoy 10 of this invention. The planes as shown are disposed at a preset orientation to each other so as to form a plurality of radially extending planes meeting at a common axis to form segments. A preferred planar orientation is shown in FIG. 1 where three flexible planes 12 are orthogonally disposed within the collapsible decoy 10 to form a plurality of trihedral angles between the flexible planes. As shown in FIG. 1, the three flexible planes 12 are orthogonally disposed to form right trihedral angles but a greater number of planes could be used to form smaller angles if such a structure gives a better reflection pattern for a particular application. The trihedral angles provide a good reflective surface which will intercept and reflect the range finder radiation over a wide variety of incident angles.

As shown in FIG. 1, the flexible planes 12 have the flexible foam material 14 attached to and disposed between the flexible planes. The foam material can be either an open or closed cell material and is generally the reaction product of two or more organic polymeric precursors. One class of foam materials suitable for practicing this invention are the polyurethanes which are the reaction product of a polyol and an isocyanate. Such materials are flexible allowing them to be compressed into a relatively small dense package but have sufficient resiliency to return the decoy to its uncompressed state when the decoy is deployed.

FIG. 2 shows the decoy 10 of FIG. 1 compressed and inserted into a sleeve 16 made of a material which will hold the decoy in the compressed configuration. In the compressed configuration, a larger number of decoys can be stored and transported. The particular shape of the storage containers can be varied to fit the available space since the reflector is compressible in all three dimensions. For example, the decoys can be put in cubical boxes or small spherical containers and in all instances will expand to their full deployed shape when removed from the container. The containers can be formed of light weight material such as cardboard since foams can be made which are easily compressed.

As shown the foam material 14 provides the structural support for the flexible planes 12 holding the flexible planes in a relatively flat planar condition when the decoy 10 is deployed. The foam material 14 could be formed by molding, slicing or the like and a decoy assembled from the various parts by joining them together with an adhesive. Also, the flexible planes could be supported in their desired deployed configuration and the foam material formed and/or molded about the flexible planes to the desired deployed configuration. In general, the foam material 14 and flexible planes 12 can be chosen so the foam material will adhere to the surface of the flexible plane sufficiently to bind the decoy into a unitary body.

I wish it to be understood that I do not desire to be limited to the exact details of construction shown and described for obvious modifications will occur to a person skilled in the art, without departing from the spirit and scope of the appended claims.

What is claimed is:

1. A self-expanding multipanel decoy device suitable for reflecting detection radiation and adapted to be stored in a substantially collapsed condition and which deploys into a corner target reflector when compressive forces are removed comprising: at least one flexible radiation reflecting panel for reflecting detection radiation to its source so as to simulate a target, said panel being sufficiently flexible to be collapsed in three dimensions and a compressible polymeric foam material disposed about and attached to the flexible panels to form a unitary body which will hold the flexible radiation reflecting panels in a relatively flat planar condition when in the deployed condition, said foam being compressible in three dimensions.

2. The decoy of claim 1 having a plurality of flexible panels said panels being disposed within and attached to each other so as to form intersecting panels.

3. The decoy of claim 1 having a plurality of randomly oriented panels.

4. The decoy of claim 1 where said poylmeric material is polyurethane.

5. The decoy of claim 1 when said reflective material is metal coated polymeric film.

6. The decoy of claim 1 where said reflective material is metal foil.

7. The decoy of claim 1 where said reflective material is metal coated clothe.

8. A self-expanding multipanel decoy device suitable for reflecting detection radiation and adapted to be stored in a substantially collapsed condition and which deploys into a corner target reflector when compressive forces are removed comprising: a plurality of flexible panels formed of a conductive cloth suitable for reflecting detection radiation to its source so as to simulate a target, the panels being sufficiently flexible to be collapsed in three dimensions and further having sufficient structural integrity to form an unbroken reflective surface when deployed; the panels are disposed in such a manner that the planes intersect at lines of intersection to form equal angles between the planes; and a compressible polymeric foam material disposed about and attached to the flexible panels, said foam being compressible in three dimensions for storage and expanding to its full deployed shape when not compressed, the planes being in a flat planar configuration within the foam when deployed.

9. The decoy of claim 8 wherein there are 3 planes disposed so as to form trihedral angles at the common point of intersection of said planes.

* * * * *